US012691432B2

(12) United States Patent
Eddaoudi et al.

(10) Patent No.: US 12,691,432 B2
(45) Date of Patent: Jul. 28, 2026

(54) PROCESS FOR CONCENTRATING CO₂ FROM AIR AND DILUTE CO₂ STREAMS USING MOF BASED PHYSISORBENTS

(71) Applicants: Saudi Arabian Oil Company, Dhahran (SA); King Abdullah University of Science and Technology, Thuwal (SA)

(72) Inventors: Mohamed Eddaoudi, Thuwal (SA); Prashant Bhatt, Thuwal (SA); Aqil Jamal, Dhahran (SA)

(73) Assignees: Saudi Arabian Oil Company, Dhahran (SA); King Abdullah University of Science and Technology, Thuwal (SA)

( * ) Notice: Subject to any disclaimer, the term of this patent is extended or adjusted under 35 U.S.C. 154(b) by 877 days.

(21) Appl. No.: 17/846,743

(22) Filed: Jun. 22, 2022

(65) Prior Publication Data

US 2022/0401873 A1 Dec. 22, 2022

Related U.S. Application Data

(60) Provisional application No. 63/213,390, filed on Jun. 22, 2021.

(51) Int. Cl.
*B01D 53/04* (2006.01)
*B01J 20/22* (2006.01)
(Continued)

(52) U.S. Cl.
CPC ........ *B01J 20/226* (2013.01); *B01D 53/0438* (2013.01); *B01D 53/0446* (2013.01);
(Continued)

(58) Field of Classification Search
CPC .............. B01D 2253/204; B01D 24/46; B01D 2257/504
See application file for complete search history.

(56) References Cited

U.S. PATENT DOCUMENTS 5,376,614 A 12/1994 Birbara et al.
5,876,488 A 3/1999 Birbara et al.
(Continued)

FOREIGN PATENT DOCUMENTS

KR 20200129648 A 11/2020
WO WO-2014074679 A1 * 5/2014 ............. B01D 53/02
(Continued)

OTHER PUBLICATIONS

Alcaraz-Calderon, A. M. et al. Natural gas combined cycle with exhaust gas recirculation and CO2 capture at part-load operation, Journal of the Energy Institute, vol. 92 (Apr. 2019), pp. 370-381 (Year: 2019).*

(Continued)

*Primary Examiner* — Jennifer Dieterle
*Assistant Examiner* — Rachel Marie Slaugovsky
(74) *Attorney, Agent, or Firm* — Leason Ellis LLP

(57) ABSTRACT

A method for capturing CO₂ from a gas stream using a metal organic framework (MOF) based physisorbent CO₂ concentrator is provided. In the method, a MOF material is pretreated, a gas stream is then introduced into the CO₂ concentrator which comprises the pretreated MOF material. CO₂ from the gas stream is captured with the CO₂ concentrator to generate a CO₂-free stream, which is discharged from the CO₂ concentrator into the atmosphere. Introduction of the gas stream into the CO₂ concentrator is stopped when the pretreated MOF material becomes saturated with CO₂. The CO₂ concentrator with the saturated MOF material is then regenerated by introducing hot air, hot nitrogen, vacuum, or a combination thereof into the CO₂ concentrator thereby generating a CO₂-rich stream. The CO₂-rich stream is diverted for purification and the regenerated CO₂ concentrator is recycled for future capture of CO₂.

14 Claims, 6 Drawing Sheets

Step-1: Adsorption

Dilute CO₂ containing stream
{Air, NGCC exhaust etc.}

Pretreated Module

CO₂ free stream

Module containing MOF with high CO₂ affinity
{KAUST-7}

Step-2: Desorption

Concentrated CO₂ containing stream
{5-50% CO₂}

CO₂ Saturated Module

Hot Air

Module containing MOF with high CO₂ affinity
{KAUST-7}

(51) Int. Cl.

| | |
|---|---|
| B01J 20/28 | (2006.01) |
| B01J 20/34 | (2006.01) |
| C01B 32/50 | (2017.01) |
| C10L 3/10 | (2006.01) |

(52) U.S. Cl.

CPC ..... *B01J 20/28016* (2013.01); *B01J 20/3425* (2013.01); *B01J 20/3483* (2013.01); *B01J 20/3491* (2013.01); *C01B 32/50* (2017.08); *C10L 3/104* (2013.01); *B01D 2253/204* (2013.01); *B01D 2257/504* (2013.01); *B01D 2259/4009* (2013.01); *C01B 2210/0015* (2013.01); *C01B 2210/0021* (2013.01); *C10L 2290/542* (2013.01)

(56) References Cited

U.S. PATENT DOCUMENTS

| | | | | |
|---|---|---|---|---|
| 7,799,120 | B2 | 9/2010 | Yaghi et al. | |
| 8,926,736 | B2 | 1/2015 | Serre et al. | |
| 9,138,719 | B1 | 9/2015 | Eddaoudi et al. | |
| 9,308,486 | B2 * | 4/2016 | Chen | B01D 53/0438 |
| 10,328,414 | B2 | 6/2019 | Eddaoudi et al. | |
| 10,335,779 | B2 | 7/2019 | Eddaoudi et al. | |
| 10,744,482 | B2 | 8/2020 | Eddaoudi et al. | |
| 10,765,989 | B2 | 9/2020 | Eddaoudi et al. | |
| 10,781,387 | B2 | 9/2020 | Eddaoudi et al. | |
| 10,850,268 | B2 | 12/2020 | Eddaoudi et al. | |
| 10,875,769 | B2 * | 12/2020 | Ingram | B01D 53/1406 |
| 11,077,423 | B2 | 8/2021 | Eddaoudi et al. | |
| 11,285,426 | B2 | 3/2022 | Cadiau et al. | |
| 2015/0291870 | A1 | 10/2015 | Van Horn et al. | |
| 2017/0137450 | A1 | 5/2017 | Eddaoudi et al. | |
| 2017/0247622 | A1 | 8/2017 | Eddaoudi et al. | |
| 2019/0022573 | A1 | 1/2019 | Weston | |
| 2019/0262762 | A1 | 8/2019 | Gadkaree et al. | |
| 2020/0384439 | A1 * | 12/2020 | Belmabkhout | B01J 20/28033 |
| 2021/0039078 | A1 | 2/2021 | Eddaoudi et al. | |
| 2022/0040668 | A1 | 2/2022 | Weston | |
| 2022/0056064 | A1 * | 2/2022 | Qazvini | B01J 20/2803 |
| 2022/0134307 | A1 * | 5/2022 | Sadiq | C09D 7/60 |
| | | | | 95/108 |

FOREIGN PATENT DOCUMENTS

| | | | | |
|---|---|---|---|---|
| WO | 2019239324 | A1 | 12/2019 | |
| WO | WO-2019239324 | A2 * | 12/2019 | ......... B01J 20/3483 |
| WO | 2020113281 | A1 | 6/2020 | |

OTHER PUBLICATIONS

Vaidhyanathan et al. "Direct Observation and Quantification of CO2 Binding Within an Amine-Functionalized Nanoporous Solid." Science, vol. 330, Oct. 29, 2010, 650-653.

Veawab et al. "Corrosion Behavior of Carbon Steel in the CO2 Absorption Process Using Aqueous Amine Solutions." Ind. Eng. Chem. Res., 1999, 3917-3924.

Wang et al. "Colossal cages in zeolitic imidazolate frameworks as selective carbon dioxide reservoirs." Nature Publishing Group, 2008, 207-212.

Yang et al. "Computational Study of CO2 Storage in Metal-Organic Frameworks." American Chemical Society, 2008, 1562-1569.

Yang et al. "Hydrothermal synthesis and characterization of a series of luminescent Zn(ii) and Cd(ii) coordination polymers with the new versatile m ultidentate ligand 1,3-di(1,2,4-triazol-4-yl)benzene." Crystengcomm, VOi. 15, No. 40, Jan. 1, 2013, 8097.

Yang et al. "Molecular Simulation of Separation of CO2 from Flue Gases in Cu-BTC Metal-Organic Framework." AlChE Journal, Nov. 2007, 2832-2840.

Yazaydin et al. "Screening of metal-organic frameworks for carbon dioxide capture from flue gas using a combined experimental and modeling approach." J. Am. Chem. Soc. 131, 2009, 18198-18199.

International Search Report and Written Opinion in a corresponding PCT Application No. PCT/US2023/061518 mailed Jun. 20, 2024; 16 pages.

Saudi Arabian Office Action in corresponding Application No. 523451598, issued Aug. 28, 2024; 16 pages.

Ben-Mansour et al. "Carbon capture by physical adsorption: materials, experimental investigations and numerical modeling and simulations—a review." Applied Energy 161 (2016): 225-255.

Fan et al. "Isoreticular chemistry within metal-organic frameworks for gas storage and separation." Coordination Chemistry Reviews 443 (2021): 213968.

Majchrzak-Kuceba et al. "Shaping metal-organic framework (MOF) powder materials for CO2 capture applications—a thermogravimetric study." Journal of Thermal Analysis and Calorimetry 138.6 (2019): 4139-4144.

Qasem et al. "Enhancing CO2 Adsorption Capacity and Cycling Stability of Mg-MOF-74." Arabian Journal for Science and Engineering 46.7 (2021): 6219-6228.

Shi et al. "Sorbents for the direct capture of CO2 from ambient air." Angewandte Chemie International Edition 59.18 (2020): 6984-7006.

Siegelman et al. "Water enables efficient CO2 capture from natural gas flue emissions in an oxidation-resistant diamine-appended metal-organic framework." Journal of the American Chemical Society 141.33 (2019): 13171-13186.

International Search Report and Written Opinion for International Patent Application No. PCT/US22/34536 mailed Sep. 28, 2022. 17 pages.

Prashant M. Bhatt et al., "A Fine-Tuned Fluorinated MOF Addresses the Needs for Trace CO2 Removal and Air Capture Using Physisorption", JACS, Jul. 2016, pp. 9301-9307.

Babarao et al. "Molecular screening of metal-organic frameworks for CO2 storage." Langmuir, 24, 2008, 6270-6278.

Bae et al. "Carborane-based metal-organic frameworks as highly selective sorbents for CO2 over methane." Chem. Commun., 2008, 4135-4137.

Banerjee et al. "Control of Pore Size and Functionality in Isoreticular Zeolitic Imidazolate Frameworks and their Carbon Dioxide Selective Capture Properties." JACS Communications, 2009, 3875-3877.

Banerjee et al. "High-Throughput Synthesis of Zeolitic Imidazolate Frameworks and Application to CO2 Capture." Science, Feb. 15, 2008, 939-943.

Barcia et al. "Single and multicomponent sorption of CO2, CH4 and N2 in a microporous metal-organic framework." Sep. Sci. Technol. 43, 2008, 3494-3521.

Bastin et al. "A Microporous Metal-Organic Framework for Separation of CO2/N2 and CO21CH4 by Fixed-Bed Adsorption." J. Phys. Chem., 2008, 1575-1581.

Belmabkhout et al. "Amine-Bearing Mesoporous Silica for CO2 and H2S Removal from Natural Gas and Biagas." Langmuir Letter, 2009, 13275-13278.

Belmabkhout et al. "Isothermal versus Non-isothermal Adsorption-Desorption Cycling of Triamine-Grafted Pore-Expanded MCM-41 Mesoporous Silica for CO2 Capture from Flue Gas." Energy & Fuels Article, American Chemical Society, 2010, 5273-5280.

Belmabkhout et al. "Simultaneous Adsorption of H2S and CO2 on Triamine-Grafted Pore-Expanded Mesoporous MCM-41 Silica." Energy & Fuels, ACS Publications, 2011, 1310-1315.

Britt et al. "Highly efficient separation of carbon dioxide by a metal-organic framework replete with open metal sites." Dec. 8, 2009, 20637-20640.

Burd et al. "Highly Selective Carbon Dioxide Uptake by [Cu(bpy-n)2(SiF6)] (bpy-1=4,4'-Bipyridine; bpy-2=1,2-Bis (4-pyridyl)ethene)." Journal Of The American Chemical Society, Feb. 8, 2012, 3663-3666.

Cadiau et al. "Hydrothermal synthesis, ab-initio structure determination and NMR study of the first mixed Cu—Al huorinated MOF." CrystEngComm, The Royal Society of Chemistry, 2013, 3430-3435.

Cadiau et al. "ZnAIF5'[TAZ]: An A1 fluorinated MOF of MIL-53{A1} topology with cationic {Zn{1,2,4 triazole)}2 + linkers." Journals of Materials Chemistry, vol. 21, 2011, 3949-3951.

(56) References Cited

OTHER PUBLICATIONS

Caskey et al. "Dramatic Tuning of Carbon Dioxide Uptake via Metal Substitution in a Coordination Polymer with Cylindrical Pores." JAGS Communications, 2008, 10870-10871.

Chue et al. "Comparison of Activated Carbon and Zeolite 13X for COa Recovery from Flue Gas by Pressure Swing Adsorption." Ind. Eng. Chem. Res., 1995, 591-598.

Couck et al. "An Amine-Functionalized MIL-53 Metal-Organic Framework with Large Separation Power for CO2 and CH4." JACS, 2009.

Dietzel et al. "Adsorption properties and structure of CO2 adsorbed on open coordination sites of metal-organic framework Ni2 (dhtp) from gas adsorption, IR spectroscopy and X-ray diffraction." ChemComm, 2008, 5125-5127.

Dietzel et al. "Hydrogen adsorption in a nickel based coordination polymer with open metal sites in the cylindrical cavities of the desolvated framework." 2006, 959-961.

Ding et al. "Hydrothermal syntheses and characterization of a series of luminescent Cd(ii) frameworks with pyridine-based and benzene-based bis-triazole ligands." Crystengcomm, vol. 15, No. 13, Jan. 1, 2013, 2490-2503.

Finsy et al. "Separation of CO2/CH4 mixtures with the MIL-53(Al) metal-organic." Microporous and Mesoporous Materials, 2009, 221-227.

Furkawa et al. "Storage of Hydrogen, Methane, and Carbon Dioxide in Highly Porous Covalent Organic Frameworks for Clean Energy Applications." JAGS Article, American Chemical Society, 2009, 8875-8883.

Gautier et al. "On the Origin of the Differences in Structure Directing Properties of Polar Metal Oxyfluoride [MOxF6-x]2—(x= 1,2) Building Units." Inorganic Chemistry, Jan. 22, 2015, 1712-1719.

Gautier et al. "Orientatinal order of [VOF5]2- and [NbOF5)2- polar units in chains." Journal of Solid State Chemistry, vol. 195, Jan. 24, 2012, 132-139.

Guillory et al. "Evidence for Nonpolar Alignment of (NbOF 5] 2—Anions in Cd{pyridine) 4 NbOF 5 Chains." Crystal Growth & Design, Feb. 1, 2006, 382-389.

Haisheng et al. "Microporosity, Optical Bandgap Sizes, and Photocatalytic Activity of M(I)-Nb(V) (M=Cu, Ag) Pxyfluoride Hybrids." Crystal Growth & Design Article, vol. 10, 2010, 1323-1331.

Halasyamani et al. "Syntheses and Structures of Two New Cu/Nb/ pyrazine Complexes: Three Dimensional CuNb (pyz)20F5-(pyz)(H20) and Two Dimensional [Cu(pyz)2.5J+[NbF6-(Pyz)." Zeitschrift fur anorganische und allgemeine Chemie, 1996, 479-485.

Hamon et al. "Comparative Study of Hydrogen Sulfide Adsorption in the MIL-53(Al, Cr, Fe), MIL-47(V), MIL-100(Cr), and MIL-101(Cr) Metal-Organic Frameworks at Room Temperature." JAGS Communications, Mar. 2, 2009, 8775-6777.

Hao et al. "Upgrading low-quality natural gas with H2S- and CO2-selective polymer membranes Part I. Process design and economics of membrane stages without recycle streams." Journal of Membrane Science, 2002, 177-206.

Heier et al. "The Polar [W02F4]2-Anion in the Solid State." Inorg. Chem., 1999, 762-767.

Hook et al. "An Investigation of Some Sterically Hindered Amines as Potential Carbon Dioxide Scrubbing Compounds." Ind. Eng. Chem. Res., 1997, 1779-1790.

Izumi et al. "Examining the Out-of-Center Distortion in the (NbOF 5] 2-Anion." Inorganic Chemistry, Feb. 1, 2005, 884-895.

Li et al. "Gas Adsorption and Storage in Metal-Organic Framework MOF-177." Langmuir, 2007, 12937-12944.

Lin et al. "Microporosity, Optical Bandgap Sizes, and Photocatalytic Activity of M(I)-Nb(V) (M=Cu, Ag) Oxyfluoride Hybrids." Crystal Growth & Design, vol. 10, No. 3, 2010, 1323-1331.

Llewellyn et al. "High Uptakes ofCO2 and CH4 in Mesoporous Metal-Organic Frameworks MIL-100 and MIL-101." Langmuir, American Chemical Society, 2008, 7245-7250.

Maggard et al. "Understanding the Role of Helical Chains in the Formation of Noncentrosymmetric Solids." American Chemical Society, 2001, 7742-7743.

Mahenthirarajah et al. "Organic-inorganic hybrid chains and layers constructed from copper-amine cations and early transition metal (Nb, Mo) oxyfluoride anions." Dalton Transaction, Jan. 1, 2009, p. 3280.

Mandal et al. "Simultaneous absorption of CO2 and H2S into aqueous blends of N-methyldiethanolamine and diethanolamine." Environ. Sci. Technol. 2006, 40, 6076-6084.

Marvel et al. "Chemical Hardness and the Adaptive Coordination Behavior of the d 0 Transition Metal Oxide Fluoride Anions." Zeitschrift Fur Anorganische und Allgemeine Chemie., vol. 635, No. 6-7, May 31, 2009, 869-877.

Noro et al. "Framework Engineering by Anions and Porous Functionalities of Cu(II)/4,4'-bpy Coordination Polymers." JAGS Articles, vol. 124, 2002, 2568-2583.

Noro et al. "A New, Methane Adsorbent, Porous Coordination Polymer [{CuSiF6(4,4'-bipyridine)2}n]." Angew. Chem. Int. Ed., 2000, 2081-2084.

Nugent et al. "Enhancement of CO2 selectivity in a pillared pcu MOM platform through pillar substitution." ChemComm, The Royal Society of Chemistry, 2013, 1606-1608.

Nugent et al. "Porous materials with optimal adsorption thermodynamics and kinetics for CO2 separation." Nature, Mar. 7, 2013, 80-84.

Park et al. "Exceptional chemical and thermal stability of zeolitic imidazolate frameworks." PNAS, Jul. 5, 2006, 10186-10191.

Phan et al. "Synthesis, Structure, and Carbon Dioxide Capture Properties of Zeolitic Imidazolate Framerworks." Accounts of Chemical Research, vol. 43, No. 1, Oct. 30, 2009, 58-67.

Shekhah et al. "Made-to-order metal-organic frameworks for trace carbon dioxide removal and air capture." Nature Communications, Jun. 25, 2014, 1-7.

Siriwardane et al. "Adsorption of CO2 on Molecular Sieves and Activated Carbon." Energy & Fuels, American Chemical Society, 2001, 279-284.

Skoulidas et al. "Self-Diffusion and Transport Diffusion of Light Gases in Metal-Organic Framework Materials Assessed Using Molecular Dynamics Simulations." J. Phys. Chem., 2005, 15760-15768.

Smida et al. "Hydrothermal synthesis, thermal decomposition and optical properties of Fe2F5(H20)(Htaz)(taz) (Hdma)." Arabian Journal of Chemistry, Apr. 19, 2015, 6.

Subramanian et al. "Porous Solids by Design: [Zn(4,4'-bpy)2(SiF6)]n-xDMF, a Single Framework Octahedral Coordination Polymer with Large Square Channels." Angew. Chem. Int Ed. Engl., 1995, 2127-2129.

Uemura et al. "Syntheses, Crystal Structures and Adsorption Properties of Ultramicroporous Coordination Polymers Constructed from Hexafluorosilicate Ions and Pyrazine." Eur. J. Inorg. Chem., 2009, 2329-2337.

Tchalala et al.; Fluorinated MOF platform for selective removal and sensing of SO2 from flue gas and air; Nature Communications; 2019; 10 pages.

First Office Action in related Chinese Application No. 202280043763. 7, dated May 20, 2026, including translation. 21 pages.

* cited by examiner

PROCESS FOR CONCENTRATING CO₂ FROM AIR AND DILUTE CO₂ STREAMS USING MOF BASED PHYSISORBENTS

CROSS REFERENCE TO RELATED APPLICATION

The present application is based on and claims priority to U.S. Provisional Patent Application Ser. No. 63/213,390 entitled "Process for Concentrating CO2 from Air and Dilute CO2 Streams Using MOF Based Physisorbents," filed Jun. 22, 2021, the contents of which are hereby incorporated by reference as if set forth expressly in its entirety herein.

FIELD OF THE DISCLOSURE

The present disclosure relates to methods for capturing $CO_2$ from a gas stream, and in particular methods for capturing $CO_2$ from a gas stream using a metal organic framework (MOF)-based physisorbent.

BACKGROUND OF THE DISCLOSURE

Global warming associated climate changes are one of the biggest challenges faced by humanity in recent times. An increase in atmospheric $CO_2$ concentration over the last century, mainly owing to industrial and vehicular $CO_2$ emissions, is directly related to global warming.

As of now, $CO_2$ concentration in the atmosphere has reached around 415 ppm and is increasing continuously at the rate of 2-3 ppm per year. If $CO_2$ emissions are not stopped or reduced drastically, we will cross a tipping point of 450 ppm $CO_2$ concentration in a few years, which will lead to a series of never-ending environmental catastrophes.

The world is in no position to stop or significantly lessen the use of fossil fuels and will be dependent on fossil fuels for at least the next few decades. In such a scenario, $CO_2$ capture is an important technology for the mitigation of increasing $CO_2$ concentration in the atmosphere and accompanying global warming. There are a lot of efforts to develop material and technology to capture $CO_2$ from flue gas (industrial emission) as well as directly from air (direct air capture). $CO_2$ capture from flue gas is currently done at 10-15% $CO_2$ concentration, and there are some emerging technologies for this purpose.

Direct air capture is even more complicated; here, $CO_2$ needs to be captured 400 ppm concentration, more than 200 times lower than flue gas. The advantage of direct air capture is that capture can be carried out at any place in the world, and it can take care of emissions from diffuse sources like the transport sector. Among the investigated materials, liquid amines and other amine-based chemisorbents have shown promise for both of these applications. However, these chemisorbent materials require very high energy for regeneration (100-120 kj/mol); this would practically nullify the positive impact of $CO_2$ capture. Moreover, amine-based materials are prone to degradation and produce toxic decomposition products that can have a detrimental effect on the environment. Another approach is to use physisorbent materials, where the driving force of $CO_2$ adsorption is nonbonding interaction between material and $CO_2$.

Metal-organic framework (MOF) is a relatively new class of adsorbent that has received a lot of attention in recent times, mainly because of the crystalline and modular nature that can be used in a variety of applications ranging from separation, storage, catalysis, sensor, electrochemistry, etc. Over the years, many MOF materials have shown remarkable $CO_2$ capture properties.

$CO_2$ capture from Natural Gas Combined Cycle (NGCC) power plant is another challenging $CO_2$ capture application. NGCC is more efficient and environmentally friendly, hence it is preferred over traditional coal-based power stations. Most of the future fossil fuel-based power stations are expected to use natural gas. Consequently, there is a huge market for technology that can capture $CO_2$ from NGCC plants. However, currently there are no materials that can reliably and economically capture $CO_2$ from NGCC exhaust gas (4% $CO_2$, 10-13% $O_2$). The main difficulties for NGCC $CO_2$ capture are low $CO_2$ concentration and high oxygen content of the exhaust gas stream. Most material does not fulfill the collective requirement of decent $CO_2$ capacity at 4% $CO_2$ concentration in the presence of moisture and good oxygen stability at high temperatures.

These and other challenges are addressed by the present application.

SUMMARY OF THE DISCLOSURE

According to a first aspect, a method for capturing $CO_2$ from a gas stream containing approximately 400 ppm to 6% of $CO_2$ using a metal-organic framework (MOF) based physisorbent $CO_2$ concentrator is provided. In the method, a MOF material is pretreated under airflow or vacuum. A gas stream is then introduced into the $CO_2$ concentrator, which comprises the pretreated MOF material. $CO_2$ from the gas stream is captured with the $CO_2$ concentrator to generate a $CO_2$-free stream in the $CO_2$ concentrator. The $CO_2$-free stream is discharged from the $CO_2$ concentrator into the atmosphere. The gas stream is stopped from being introduced into the $CO_2$ concentrator when the pretreated MOF material becomes saturated with $CO_2$. The $CO_2$ concentrator is regenerated from the saturated MOF material by introducing hot air, hot nitrogen, vacuum, or a combination thereof, thereby generating a $CO_2$-rich stream. The generated $CO_2$-rich stream is diverted for direct purification or mixing with a stream of industrial exhaust with similar $CO_2$ concentrations for subsequent purification. The regenerated $CO_2$ concentrator is utilized for future capture of $CO_2$.

In another aspect, the $CO_2$ concentrator comprises the pretreated MOF with a binder in a closed module and one or more gas valves configured to manipulate the flow of the gas stream inside the $CO_2$ concentrator.

In another aspect, the binder is an organic polymer or an inorganic binder.

In another aspect, the gas stream is gas from a natural gas combined cycle (NGCC) exhaust comprising 2-6% $CO_2$, 10-13% $O_2$ and 2-10% $H_2O$ vapor. In another aspect, the gas stream is air.

In another aspect, the MOF material has a general formula of $M_aM_bF_{6-n}(O/H_2O)_w(Ligand)_x(solvent)_y]_z$, wherein $M_a$ is selected from periodic groups IB, IIA, IIB, IIIA, IV A, IVB, VIB, VIIB, and VIII, and Mb is selected from periodic groups IIIA, MB, IVB, VB, VIB, and VIII, and wherein the ligand comprises is an organic, poly-functional, or N-donor ligand. In a further aspect, the solvent is one or more of $H_2O$, DMF, and DEF.

In another aspect, the MOF material is KAUST-7.

In another aspect, the gas stream is cooled to approximately 20-25° C. before introduction into the $CO_2$ concentrator.

In another aspect, the MOF material is in the form of pellets, laminates, or other structured forms.

In another aspect, the MOF material is pretreated at a temperature in the range of approximately 60-150° C. under dynamic vacuum or dry inert gas.

In another aspect, the pretreatment of the MOF material removes previously adsorbed molecules.

In another aspect, the generated $CO_2$-rich stream has a $CO_2$ concentration of approximately 5-50%.

In another aspect, the $CO_2$ concentrator is regenerated by introducing hot air or hot nitrogen, and wherein the hot air or hot nitrogen is introduced at a temperature of approximately 80-150° C.

In another aspect, the $CO_2$-rich stream is 1-10% $CO_2$ and the purification of the $CO_2$-rich stream comprises purifying the $CO_2$-rich stream to pure $CO_2$ or to a stream that comprises at least 90% $CO_2$.

In a second aspect, a method for continuous capturing of $CO_2$ from a gas stream containing approximately 400 ppm to 6% of $CO_2$ using multiple metal-organic framework (MOF) based physisorbent $CO_2$ concentrators is provided. In the method, MOF material is pretreated under airflow or vacuum. A gas stream is then introduced into a first $CO_2$ concentrator which comprises the pretreated MOF material. $CO_2$ from the gas stream is captured with the first $CO_2$ concentrator to generate a $CO_2$-free stream in the first $CO_2$ concentrator. The $CO_2$-free stream is discharged from the first $CO_2$ concentrator into the atmosphere. A second $CO_2$ concentrator comprising pretreated MOF material is substituted for the first $CO_2$ concentrator when the pretreated MOF material of the first $CO_2$ concentrator becomes saturated with $CO_2$. The first $CO_2$ concentrator is regenerated from the saturated MOF material by introducing hot air, hot nitrogen, vacuum, or a combination thereof, thereby generating a $CO_2$-rich stream. The generated $CO_2$-rich stream is diverted for direct purification or mixing with a stream of industrial exhaust with similar $CO_2$ concentrations for subsequent purification. The regenerated first $CO_2$ concentrator is recycled for future capture of $CO_2$.

In another aspect, the gas stream is gas from a natural gas combined cycle (NGCC) exhaust comprising 2-6% $CO_2$, 10-13% $O_2$ and 2-10% $H_2O$ vapor.

In another aspect, the MOF material has a general formula of $M_aM_bF_{6-n}(O/H_2O)_w(Ligand)_x(solvent)_y]_z$, wherein $M_a$ is selected from periodic groups IB, IIA, IIB, IIIA, IV A, IVB, VIB, VIIB, and VIII, and Mb is selected from periodic groups IIIA, MB, IVB, VB, VIB, and VIII, and wherein the ligand comprises is an organic, poly-functional, or N-donor ligand.

In another aspect, the MOF material is KAUST-7.

In another aspect, the MOF material is pretreated at a temperature in the range of approximately 60-150° C. under dynamic vacuum or dry inert gas, and the method further comprises the step of cooling the gas stream to approximately 20-25° C. before introduction into the first $CO_2$ concentrator.

BRIEF DESCRIPTION OF THE DRAWINGS

The process of the disclosure will be described in more detail below and with reference to the attached drawings in which the same number is used for the same or similar elements.

DETAILED DESCRIPTION OF CERTAIN EMBODIMENTS OF THE DISCLOSURE

Figure 1A:
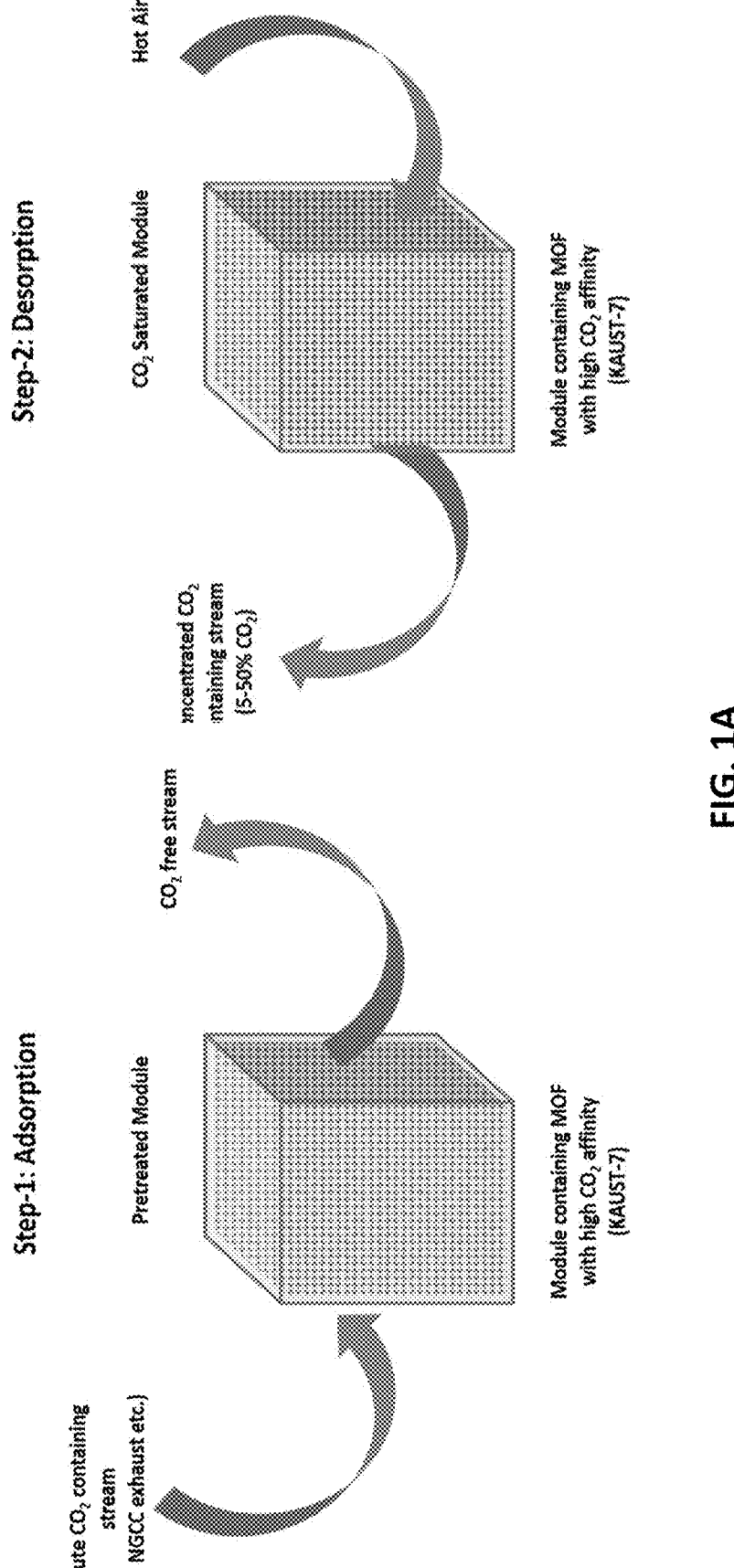
FIG. 1A. Schematic representation of MOF-based physisorbent $CO_2$ concentrator system involving adsorption and desorption cycles.

Disclosed herein are metal organic framework (MOF)-based systems and processes for adsorbing $CO_2$ from gas streams (Air, NGCC exhaust, etc.), such as dilute $CO_2$ gas streams, and generating a $CO_2$-rich stream (e.g., $CO_2$ concentration ranging from 1-50%). The generated $CO_2$-rich stream can be then purified further by existing materials or technologies. The MOF-based systems and methods can include a MOF-based physisorbent $CO_2$ concentrator ("$CO_2$ concentrator"). The $CO_2$-rich stream is generated by the $CO_2$ concentrator and can be either purified directly or can be mixed with another stream of industrial exhaust with similar concentrations before purification. The $CO_2$ concentrator can use hot air, hot nitrogen, vacuum, or other suitable methods, or a combination thereof to recover adsorbed $CO_2$ to produce the $CO_2$-rich gas stream.

Direct air capture and $CO_2$ capture from NGCC exhaust are considered very difficult compared to $CO_2$ capture from flue gas streams (10-15% $CO_2$). The $CO_2$ concentrator of the present systems and methods can bridge differences in maturity between the technologies for $CO_2$ capture from dilute (400 ppm to 5%) and concentrated streams (10-30%). The present $CO_2$ concentrator-based technology can also expand the envelope of $CO_2$ capture technologies to a wide concentration range and accelerate the efforts to mitigate increasing $CO_2$ concentration in the atmosphere and accompanying global warming.

These and other aspects of the present systems and methods are described in further detail below. Further, as used in the present application, the term "approximately" when used in conjunction with a number refers to any number within about 5, 3 or 1% of the referenced number, including the referenced number.

As mentioned briefly above, in one or more embodiments, the present system includes a metal organic framework (MOF)-based physisorbent $CO_2$ concentrator. An exemplary schematic diagram showing an exemplary MOF-based physisorbent $CO_2$ concentrator 10 and demonstrating a method using the present MOF-based physisorbent $CO_2$ concentrator is provided in FIG. 1A.

An MOF can include a metal-based node and an organic ligand which form a coordination network having advantageous crystalline and porous characteristics that affect structural integrity and interaction with foreign species, such as gases. The particular combination of nodes and ligands within a MOF impacts the topology and functionality of the MOF. As such, ligand modification or functionalization can be used to adjust the environment in the internal pores of the MOF to suit specific applications.

In one or more embodiments, the MOF material used in the $CO_2$ concentrator 10 of the present application can be any existing or new MOF material with suitable $CO_2$ capture properties. In one or more embodiments, the MOF material has a general formula of $M_aM_bF_{6-n}(O/H_2O)_w(Ligand)_x(solvent)_y]_z$. In one or more embodiments, $M_a$ comprises elements selected from periodic groups IB, IIA, IIB, IIIA, IV A, IVB, VIB, VIIB, and VIII. In one or more embodiments, $M_b$ comprises elements selected from periodic groups IIIA, MB, IVB, VB, VIB, and VIII. In one or more embodiments, $M_a$ can comprise one of the following cations: $Cu^{2+}$, $Zn^{2+}$, $Co^{2+}$, $Ni^{2+}$, $Mn^{2+}$, $Zr^{2+}$, $Fe^{2+}$, $Ca^{2+}$, $Ba^{2+}$, $Pb^{2+}$, $Pt^{2+}$, $Pd^{2+}$, $Ru^{2+}$, $Rh^{2+}$, $Cd^{2+}$, $Mg^{+2}$, $Al^{+3}$, $Fe^{+2}$, $Fe^{+3}$, $Cr^{2+}$, $Cr^{3+}$, $Ru^{2+}$, $Ru^{3+}$ and $Co^{3+}$. In some embodiments, $M_b$ can be one of the following $Al^{+3}$, $Fe^{+2}$, $Fe^{+3}$, $Cr^{2+}$, $Cr^{3+}$, $Ti^{3+}$, $V^{3+}$, $V^{5+}$, $Sc^{3+}$, $In^{3+}$, $Nb^{5+}$, $Y^{3+}$. In one or more embodiments, the ligand comprises an organic, poly-functional, or N-donor ligand. A non-limiting list of solvents can include one or more of $H_2O$, DMF, and DEF. In one or more embodiments, the solvent can include a chemical species present after fabrication of the MOF. In at least one embodiment, the MOF material is KAUST-7 (CAS: 1973399-07-3).

In one or more embodiments, the MOF material is in the form of pellets, laminates, or other structured forms of the MOF such as a monolith or any other structured form to hold MOF particles in a particular shape. The MOF material can also comprise one or more appropriate binders. In at least embodiment, the one or more binders can include but are not limited to one or more of the following: organic polymers (e.g., polyethylene, polystyrene, polyethylene glycol, polyvinyl alcohol, polysulfone, polymethylmethacrylate) and inorganic binders (e.g., kaolinite, gypsum).

In one or more embodiments the $CO_2$ concentrator 10 is a closed module that includes the MOF material and the binder in the closed module. In one or more embodiments, the $CO_2$ concentrator 10 further includes one or more gas valves configured to manipulate the flow of the gas stream inside the module.

In one or more embodiments, a method for capturing (e.g., adsorbing) $CO_2$ from a gas stream using a metal organic framework (MOF)-based physisorbent $CO_2$ concentrator 10 of the present application is provided. A flow diagram showing steps of the method for capturing $CO_2$ from a gas stream using the present MOF-based physisorbent $CO_2$ concentrator 10 is provided in FIG. 1B.

Figure 1B:
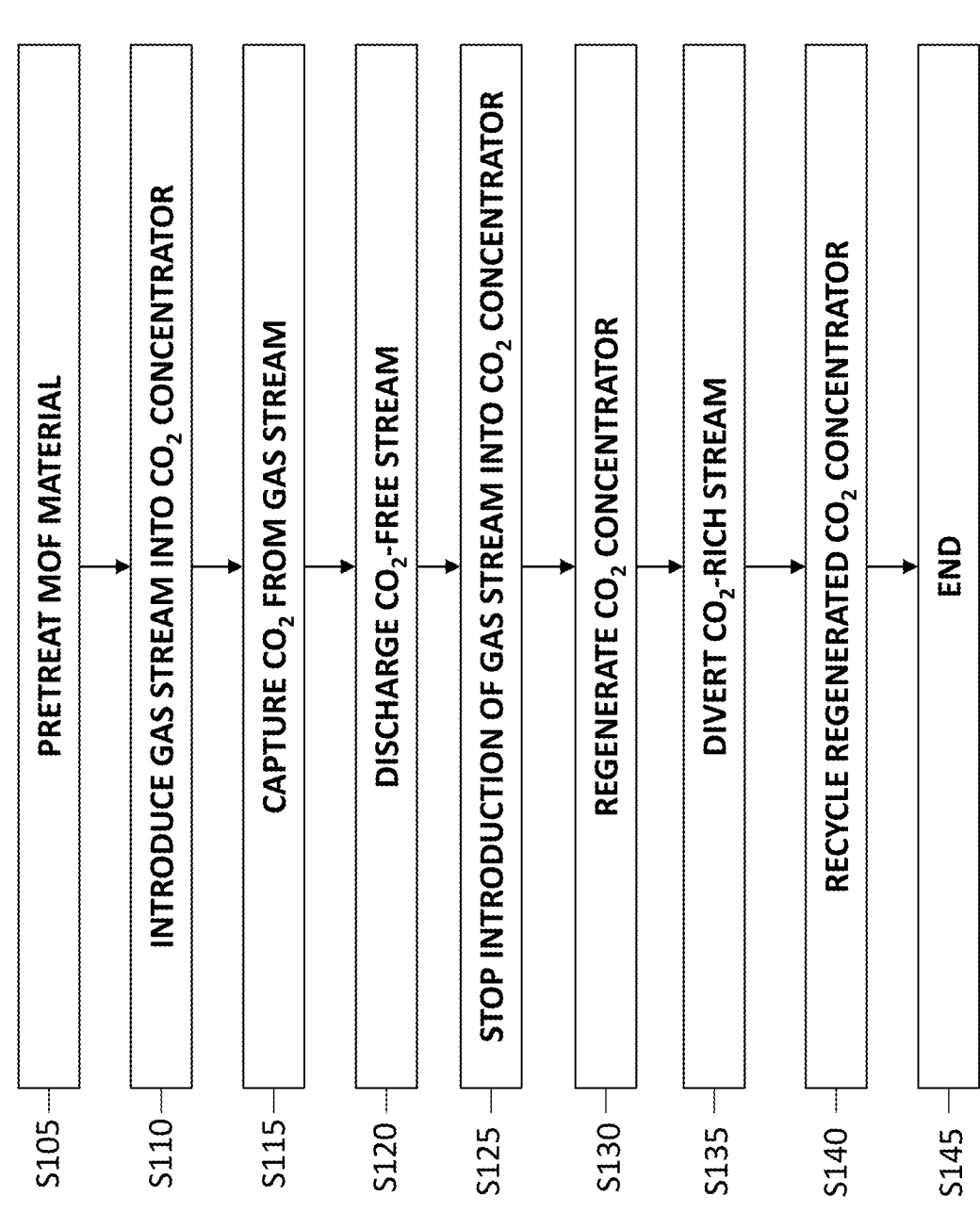
FIG. 1B. A flow diagram showing steps of a method for capturing $CO_2$ from a gas stream using an MOF-based physisorbent $CO_2$ concentrator.

With reference now to FIG. 1A and the flow diagram of FIG. 1B, the method 100 begin at a step S105 where the MOF material of the $CO_2$ concentrator is pretreated at a suitable temperature under airflow, vacuum, or other methods. In one or more embodiments, pretreatment of the MOF material removes any previously adsorbed molecules such as $H_2O$ and other guest molecules before the gas stream is introduced into the $CO_2$ concentrator. Pretreatment of the MOF material improves the MOF material's ability to adsorb target molecules (e.g. $CO_2$) in the pores. In one or more embodiments, during pretreatment, the MOF is subjected to a temperature in the range of approximately 60-150° C. under dynamic vacuum or dry inert gas (e.g., $N_2$, $O_2$, Ar, He or air) flow. The pretreated MOF is incorporated into the $CO_2$ concentrator. In one or more embodiments, pretreatment of the MOF material is performed after the MOF material has been incorporated in the $CO_2$ concentrator.

At step S110, a gas stream is introduced into the $CO_2$ concentrator which comprises the pretreated MOF material. In one or more embodiments, the gas stream is air or exhaust gas from a natural gas combined cycle (NGCC). In embodiments in which the gas stream is air, the air can be breathable air (e.g., atmospheric air), which can include one or more of nitrogen ($N_2$), oxygen ($O_2$), nitrogen ($N_2$), and argon (Ar) in addition to $CO_2$. In one or more embodiments, the NGCC exhaust gas is comprised of approximately 2-6% $CO_2$ or approximately 3-5% $CO_2$ or approximately 4% $CO_2$. In one or more embodiments, the NGCC exhaust gas also comprises approximately 10-13% $O_2$. In one or more embodiments, the NGCC exhaust gas further comprises 2-10% $H_2O$ vapor. In one or more embodiments, the NGCC exhaust gas can include other components such as small proportions of $SO_2$ and $NO_x$. In one or more embodiments, the gas stream is first cooled to a suitable temperature (e.g., approximately room temperature [20-25° C.]) before being introduced into the $CO_2$ concentrator. In one or more embodiments, the $CO_2$ concentrator temperature during adsorption (capture) is also recommended in the same temperature range (approximately 20-25° C.) and the temperature of the incoming gas stream helps it to maintain the similar temperature.

In at least one embodiment, the gas stream is a diluted gas stream. For example, the diluted gas stream can comprise approximately 400 ppm to 5% or 400 ppm to 6% of $CO_2$. In one or more embodiments, the flow rate of the NGCC gas stream depends on the capacity of NGCC plant. In one or more embodiments, the present system, including the $CO_2$ concentrator, can handle at least 80-90% of total NGCC exhaust produced by a NGCC plant.

Once the gas stream is introduced into the $CO_2$ concentrator, at step S115 the $CO_2$ in the gas stream is captured with the $CO_2$ concentrator that comprises the pretreated MOF material. In one or more embodiments, the capturing of the $CO_2$ comprises physical adsorption of the $CO_2$ by the MOF material of the $CO_2$ concentrator. In at least one embodiment, capturing the $CO_2$ comprises chemisorption of the $CO_2$ by the MOF material of the $CO_2$ concentrator, which can occur by the $CO_2$ chemically interacting with one or more open metal sites of the MOF material. In at least one embodiment, capturing the $CO_2$ comprises both physical adsorption and chemisorption of the $CO_2$ by the MOF material of the $CO_2$ concentrator. In one or more embodiments, the MOF material has a $CO_2$ adsorption capacity in the range of approximately 0.5 wt %-10 wt %.

Additionally, in one or more embodiments, capturing the $CO_2$ can comprise wholly or partially containing the $CO_2$ within pores of the MOF material. The capturing of the $CO_2$ results in the generation of a $CO_2$-free (or substantially $CO_2$-free) stream (i.e., the remainder of the gas stream from which the $CO_2$ was captured) in the $CO_2$ concentrator. Once the MOF material is saturated with $CO_2$, at step S120, the $CO_2$-free gas stream is discharged from the $CO_2$ concentrator into the atmosphere (see FIG. 1A), or optionally subjected to additional treatment, for example, to remove other components such as $SO_2$ and $NO_x$.

By the capturing the $CO_2$ via adsorption, the MOF material of the $CO_2$ concentrator becomes saturated. Once the MOF material is saturated with $CO_2$, at step S125 the gas stream (e.g., Air, NGCC exhaust, etc.) is stopped from entering the $CO_2$ concentrator. In one or more embodiments, the $CO_2$ concentrator is a closed module with one or more gas valves for receiving and dispersing of gas streams. The gas valves are configured to manipulate the flow of the gas stream inside the $CO_2$ concentrator. Thus, in one or more embodiments, the gas stream is stopped from entering the $CO_2$ concentrator upon saturation of the MOF material by closing one or more valves of the $CO_2$ concentrator. In at least one embodiment, the gas stream is stopped from entire the $CO_2$ concentrator by closing one or more valves of the NGCC exhaust unit.

At step S130, the $CO_2$ concentrator is regenerated. More specifically, the $CO_2$ saturated MOF material of the $CO_2$ concentrator is regenerated by introducing a stream of hot air, hot nitrogen, vacuum or a combination of thereof into the $CO_2$ concentrator. In one or more embodiments, the stream of hot air or hot nitrogen is introduced to the $CO_2$ concentrator at a temperature of approximately 80-150° C. As shown in FIG. 1A, as the $CO_2$ concentrator is regenerated via the introduction of a stream of hot air or hot nitrogen, said stream or hot air or hot nitrogen or vacuum removes the $CO_2$ from the MOF material of the $CO_2$ concentrator (e.g., the $CO_2$ is desorbed from the MOF material), and exits the $CO_2$ concentrator as a part of a $CO_2$-rich gas stream.

In one or more embodiments, the desorption of $CO_2$ from the MOF material is a thermal desorption, a chemical desorption (result of a chemical reaction), or a combination of both. The flow rate of the stream of hot air or hot nitrogen depends upon the amount of MOF material used and the overall process parameters. In one or more embodiments, the flow rate of the stream of hot air or hot nitrogen can be optimized to provide as high as possible a $CO_2$ concentration in the desorbed stream (i.e., $CO_2$-rich gas stream) while keeping the regeneration/desorption step as fast as possible.

At step S135, the generated $CO_2$-rich stream exits the $CO_2$ concentrator and is diverted for further processing, such as a purification step. More specifically, in one or more embodiments, the generated $CO_2$-rich stream can be diverted for direct purification or can be mixed with another stream of industrial exhaust with similar concentrations before purification. For example, in one or more embodiments the generated $CO_2$-rich stream (e.g., 1-10% $CO_2$ stream) is subsequently purified to result in a pure or substantial pure (at least 90%) $CO_2$ stream. Purification of the $CO_2$-rich stream can be done via a $CO_2$ purification unit or via other technologies as known in the art.

At step S140, the regenerated $CO_2$ concentrator is utilized in a future $CO_2$ capture process. For example, in one or more embodiments, the $CO_2$ capture process is not continuous, and thus the regenerated $CO_2$ concentrator can be used for the next $CO_2$ capture cycle. In the case of a continuous $CO_2$ capturing process, two or more $CO_2$ concentrator units can be used alternatively, such that once a first $CO_2$ concentrator becomes saturated with $CO_2$, the first $CO_2$ concentrator is swapped out for a second, unsaturated $CO_2$ concentrator for further $CO_2$ capture, in a swing mode of operation. In this embodiment, after saturation of the first $CO_2$ concentrator, the first $CO_2$ concentrator is regenerated as described above, and once the second $CO_2$ concentrator become saturated with $CO_2$, the second $CO_2$ concentrator is swapped out for the regenerated $CO_2$ concentrator to allow the $CO_2$ capture process to continue. In a continuous $CO_2$ capturing process, this swapping and recycling process for the two or more $CO_2$ concentrators can continue indefinitely. Additionally, in a continuous $CO_2$ capturing process, multiple $CO_2$ concentrators comprising the MOFs can be pretreated prior to the beginning of the process such that a pretreated, unsaturated MOF-based $CO_2$ concentrator can be quickly substituted for a saturated MOF-based $CO_2$ concentrator.

Finally, at step S145, the method ends.

The aforementioned features and aspects of the present system and methods are further described in the following examples with reference to FIGS. 2-5. These examples utilize an exemplary MOF material of the present system and method, KAUST-7. As exemplified in FIGS. 2-5, KAUST-7 provides excellent $CO_2$ capture properties from dilute streams and excellent oxygen stability.

Figure 2A:
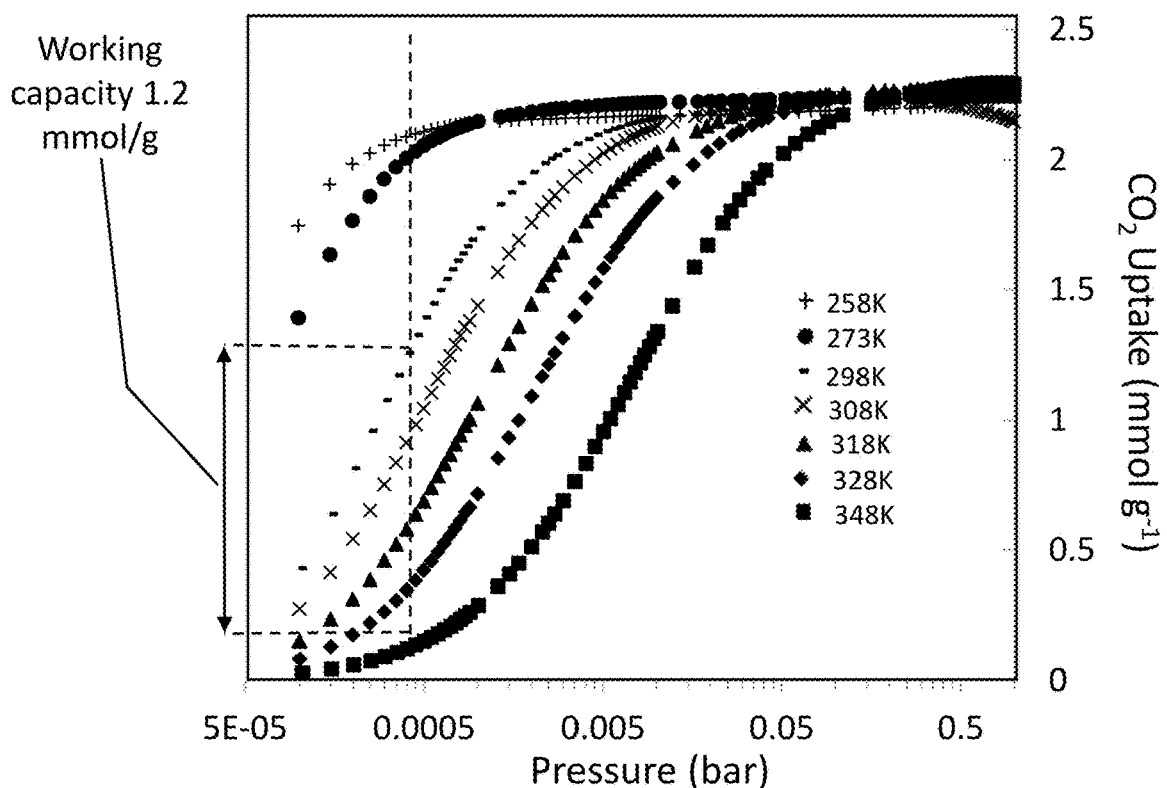
FIGS. 2A-2B. 2A) Variable temperature $CO_2$ adsorption isotherms for KAUST-7 in logarithmic scale, demonstrating high $CO_2$ uptake at low $CO_2$ concentration. 2B) Breakthrough experiment for KAUST-7 with 400 ppm $CO_2$ in $N_2$, demonstrating $CO_2$ capture performance under dynamic conditions.
Figure 2B:
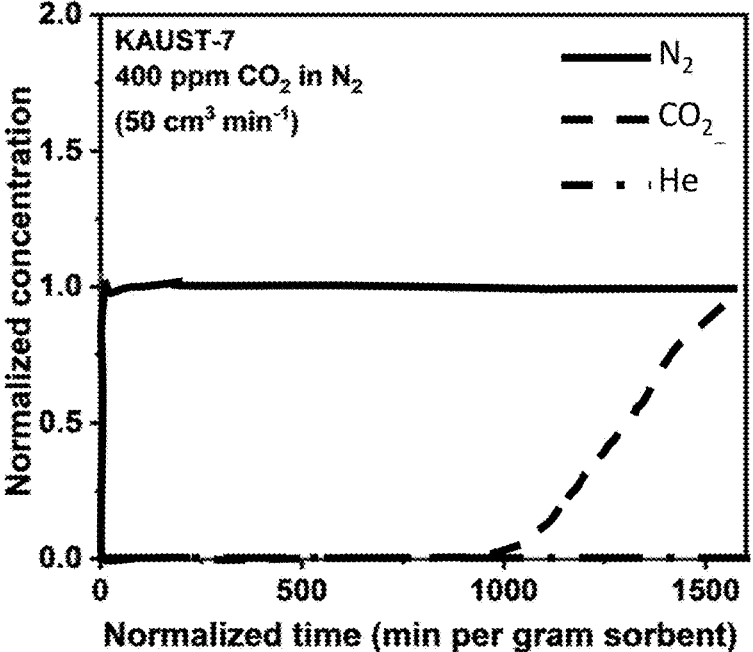

FIG. 2A display variable temperature $CO_2$ adsorption isotherms for KAUST-7 (FIG. 2A) in logarithmic scale. The graph of FIG. 2A demonstrates that KAUST-7 displays high $CO_2$ uptake at low $CO_2$ concentration. FIG. 2B displays results of a breakthrough experiment for KAUST-7 with as gas stream of 400 ppm $CO_2$ in $N_2$. The graph of FIG. 2B demonstrates excellent $CO_2$ capture performance for KAUST-7 under dynamic conditions.

Figure 3A:
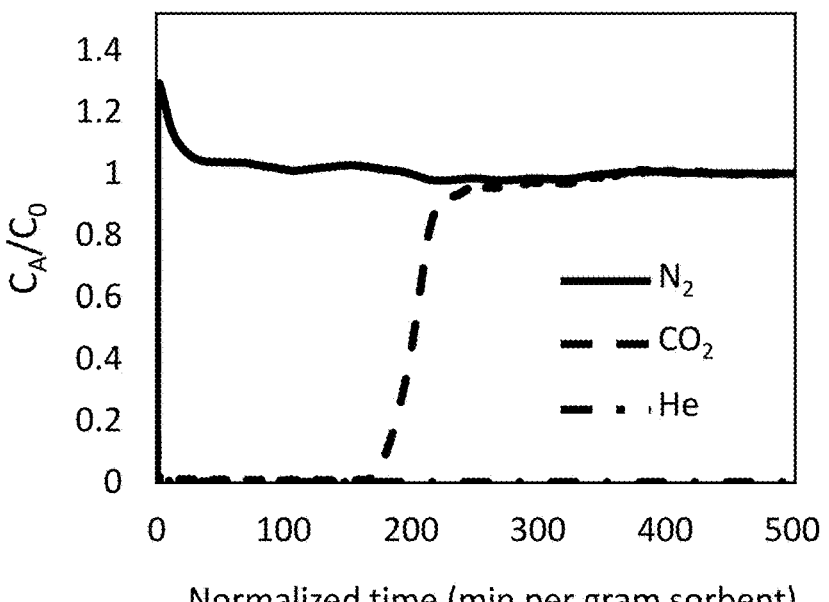
FIGS. 3A-3B. 3A) Breakthrough experiment of KAUST-7 with 1% $CO_2$ (balance $N_2$) under dry conditions with a flow rate of 25 cc/min. 3B) Corresponding TPD after $CO_2$ breakthrough experiment in dry conditions.
Figure 3B:
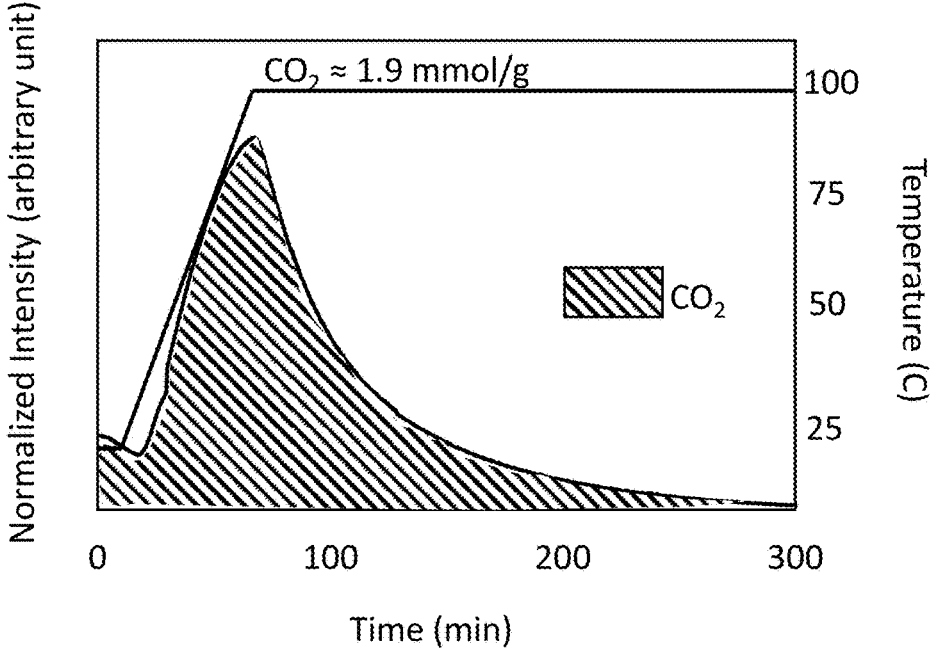

FIG. 3A displays the results of a breakthrough experiment of KAUST-7 with a gas stream comprising 1% $CO_2$ (balance $N_2$) under dry conditions with a flow rate of 25 cc/min. FIG. 3B displays the corresponding temperature programmed desorption (TPD) after the $CO_2$ breakthrough experiment in dry conditions.

Figure 4A:
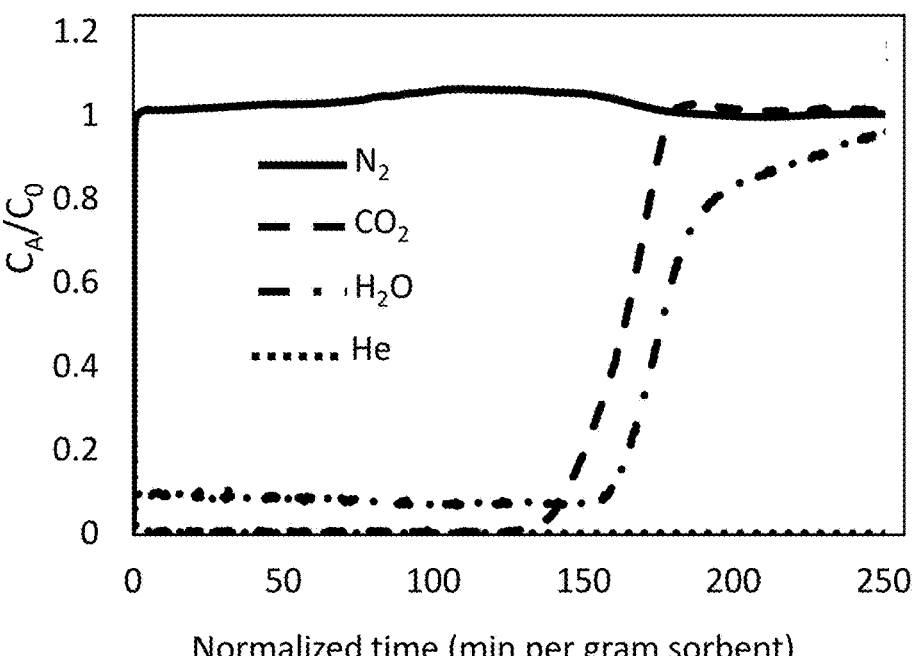
FIGS. 4A-4B. 4A) Breakthrough experiment with KAUST-7 with 1% $CO_2$ (balance $N_2$) in the presence of humidity (50% RH) with a flow rate of 25 cc/min. 4B) Corresponding TPD after water breakthrough.
Figure 4B:
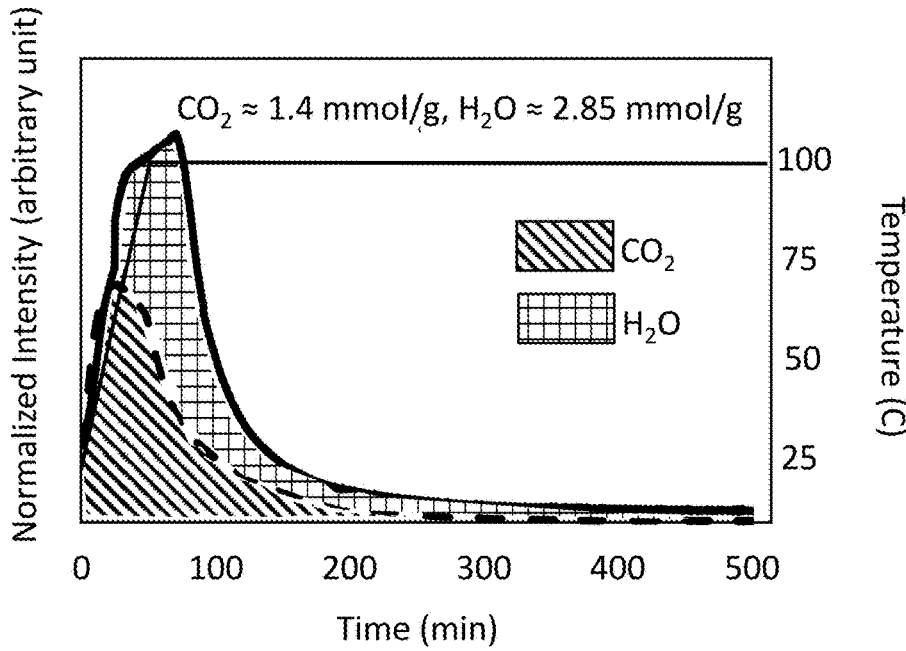

Similarly, FIG. 4A displays the result of a breakthrough experiment of KAUST-7 with a gas stream comprising 1% $CO_2$ (balance $N_2$) in the presence of humidity (50% relative humidity [RH]) with a flow rate of 25 cc/min. FIG. 4B displays the corresponding TPD after water breakthrough.

Figure 5:
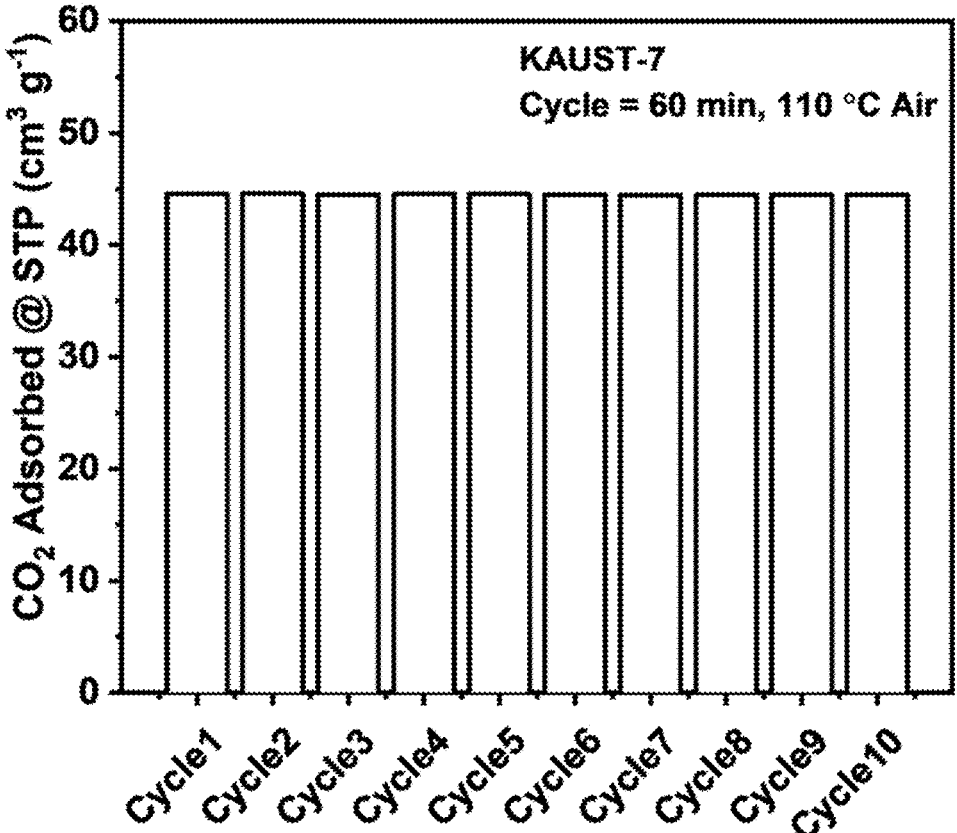
FIG. 5. $CO_2$ adsorption capacity of KAUST-7 remains the same after 10 cycles of oxygen exposure at high temperatures suggesting high oxygen stability of the material. Each cycle includes exposure of the sample to hot air at 110° C. for 60 min.

FIG. 5 displays the $CO_2$ adsorption capacity of KAUST-7 over 10 cycles of oxygen exposure at high temperatures. Each cycle includes exposure of the sample to hot air at 110° C. for 60 min. As shown in the bar graph of FIG. 5, the $CO_2$ adsorption capacity of KAUST-7 remains the same after 10 cycles of oxygen exposure at high temperatures suggesting high oxygen stability of the KAUST-7 material.

In accordance with one or more embodiments, exemplary methods are set out in the following items:

Item 1. A method for capturing $CO_2$ from a gas stream containing approximately 400 ppm to 6% of $CO_2$ using a metal organic framework (MOF) based physisorbent $CO_2$ concentrator, comprising:

pretreating a MOF material under airflow or vacuum;

introducing a gas stream into the $CO_2$ concentrator which comprises the pretreated MOF material;

capturing, with the $CO_2$ concentrator, $CO_2$ from the gas stream to generate a $CO_2$-free stream in the $CO_2$ concentrator;

discharging the $CO_2$-free stream from the $CO_2$ concentrator into the atmosphere;

stopping the introduction of the gas stream into the $CO_2$ concentrator when the pretreated MOF material becomes saturated with $CO_2$;

regenerating the $CO_2$ concentrator from the saturated MOF material by introducing hot air, hot nitrogen, vacuum, or a combination thereof, thereby generating a $CO_2$-rich stream; and diverting the generated $CO_2$-rich stream for direct purification or mixing with a stream of industrial exhaust with similar $CO_2$ concentrations for subsequent purification; and utilizing the regenerated $CO_2$ concentrator for future capture of $CO_2$.

Item 2. The method of item 1, wherein the $CO_2$ concentrator comprises the pretreated MOF with a binder in a closed module and one or more gas valves configured to manipulate the flow of the gas stream inside the $CO_2$ concentrator.

Item 3. The method of item 2, wherein the binder is an organic polymer or an inorganic binder.

Item 4. The method of any one of items 1-3, wherein the gas stream is gas from a natural gas combined cycle (NGCC) exhaust comprising 2-6% $CO_2$, 10-13% $O_2$ and 2-10% $H_2O$ vapor.

Item 5. The method of any one of items 1-3, wherein the gas stream is air.

Item 6. The method of any one of items 1-5, wherein the MOF material has a general formula of $M_aM_bF_{6-n}(O/H_2O)_w(Ligand)_x(solvent)_y]_z$, wherein $M_a$ is selected from periodic groups IB, IIA, IIB, IIIA, IV A, IVB, VIB, VIIB, and VIII, and Mb is selected from periodic groups IIIA, MB, IVB, VB, VIB, and VIII, and wherein the ligand comprises is an organic, poly-functional, or N-donor ligand.

Item 7. The method of item 6, wherein the solvent is one or more of $H_2O$, DMF, and DEF.

Item 8. The method of any one of items 1-7, wherein the MOF material is KAUST-7.

Item 9. The method of any one of items 1-8, further comprising cooling the gas stream to approximately 20-25° C. before introduction into the $CO_2$ concentrator.

Item 10. The method of any one of items 1-9, wherein the MOF material is in the form of pellets, laminates, or other structured forms.

Item 11. The method of any one of items 1-10, wherein the MOF material is pretreated at a temperature in the range of approximately 60-150° C. under dynamic vacuum or dry inert gas.

Item 12. The method of any one of items 1-11, wherein the pretreatment of the MOF material removes previously adsorbed molecules.

Item 13. The method of any one of items 1-12, wherein the generated $CO_2$-rich stream has a $CO_2$ concentration of approximately 1-50%.

Item 14. The method any one of items 1-13, wherein the $CO_2$ concentrator is regenerated by introducing hot air or hot nitrogen, and wherein the hot air or hot nitrogen is introduced at a temperature of approximately 80-150° C.

Item 15. The method any one of items 1-14, wherein the $CO_2$-rich stream is 1-10% $CO_2$ and wherein purification of the $CO_2$-rich stream comprises purifying the $CO_2$-rich stream to pure $CO_2$ or to a stream that comprises at least 90% $CO_2$.

Item 16. A method for continuous capturing of $CO_2$ from a gas stream containing approximately 400 ppm to 6% of $CO_2$ using multiple metal organic framework (MOF) based physisorbent $CO_2$ concentrators, comprising:

pretreating MOF material under airflow or vacuum;

introducing a gas stream into a first $CO_2$ concentrator which comprises the pretreated MOF material;

capturing, with the first $CO_2$ concentrator, $CO_2$ from the gas stream to generate a $CO_2$-free stream in the first $CO_2$ concentrator;

discharging the $CO_2$-free stream from the first $CO_2$ concentrator into the atmosphere;

substituting a second $CO_2$ concentrator comprising pretreated MOF material for the first $CO_2$ concentrator when the pretreated MOF material of the first $CO_2$ concentrator becomes saturated with $CO_2$;

regenerating the first $CO_2$ concentrator from the saturated MOF material by introducing hot air, hot nitrogen, vacuum, or a combination thereof, thereby generating a $CO_2$-rich stream; and diverting the generated $CO_2$-rich stream for direct purification or mixing with a stream of industrial exhaust with similar $CO_2$ concentrations for subsequent purification; and recycling the regenerated first $CO_2$ concentrator for future capture of $CO_2$.

Item 17. The method of item 16, wherein the first and second $CO_2$ concentrators each comprise the pretreated MOF with a binder in a closed module and one or more gas valves configured to manipulate the flow of the gas stream inside the first and second $CO_2$ concentrators.

Item 18. The method of item 17, wherein the binder is an organic polymer or an inorganic binder.

Item 19. The method of any one of items 16-18, wherein the gas stream is gas from a natural gas combined cycle (NGCC) exhaust comprising 2-6% $CO_2$, 10-13% $O_2$ and 2-10% $H_2O$ vapor.

Item 20. The method of any one of items 16-18, wherein the gas stream is air.

Item 21. The method of any one of items 16-20, wherein the MOF material has a general formula of $M_aM_bF_{6-n}(O/H_2O)_w(Ligand)_x(solvent)_y]_z$, wherein $M_a$ is selected from periodic groups IB, IIA, IIB, IIIA, IV A, IVB, VIB, VIIB, and VIII, and Mb is selected from periodic groups IIIA, MB, IVB, VB, VIB, and VIII, and wherein the ligand comprises is an organic, poly-functional, or N-donor ligand.

Item 22. The method of item 21, wherein the solvent is one or more of $H_2O$, DMF, and DEF.

Item 23. The method of any one of items 16-22, wherein the MOF material is KAUST-7.

Item 24. The method of any one of items 16-23, further comprising cooling the gas stream to approximately 20-25° C. before introduction into the first $CO_2$ concentrator.

Item 25. The method of any one of items 16-24, wherein the MOF material is in the form of pellets, laminates, or other structured forms.

Item 26. The method of any one of items 16-25, wherein the MOF material is pretreated at a temperature in the range of approximately 60-150° C. under dynamic vacuum or dry inert gas.

Item 27. The method of any one of items 16-26, wherein the pretreatment of the MOF material removes previously adsorbed molecules.

Item 28. The method of any one of items 16-27, wherein the generated $CO_2$-rich stream has a $CO_2$ concentration of approximately 1-50%.

Item 29. The method any one of items 16-28, wherein the first $CO_2$ concentrator is regenerated by introducing hot air or hot nitrogen, and wherein the hot air or hot nitrogen is introduced at a temperature of approximately 80-150° C.

Item 30. The method any one of items 16-29, wherein the $CO_2$-rich stream is 1-10% $CO_2$ and wherein purification of the $CO_2$-rich stream comprises purifying the $CO_2$-rich stream to pure $CO_2$ or to a stream that comprises at least 90% $CO_2$.

It is to be understood that like numerals in the drawings represent like elements through the several figures, and that not all components and/or steps described and illustrated with reference to the figures are required for all embodiments or arrangements. Further, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "including," "comprising," or "having," "containing," "involving," and variations thereof herein, when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Notably, the figures and examples above are not meant to limit the scope of the present disclosure to a single implementation, as other implementations are possible by way of interchange of some or all the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

The foregoing description of the specific implementations will so fully reveal the general nature of the disclosure that others can, by applying knowledge within the skill of the relevant art(s), readily modify and/or adapt for various applications such specific implementations, without undue experimentation, without departing from the general concept of the present disclosure. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). It is to be understood that dimensions discussed or shown are drawings accordingly to one example and other dimensions can be used without departing from the disclosure.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A method for capturing $CO_2$ from a gas stream containing approximately 400 ppm to 6% of $CO_2$ using a metal organic framework (MOF) based physisorbent $CO_2$ concentrator, comprising:
    pretreating a MOF material under airflow or vacuum, wherein the MOF material is KAUST-7;

introducing a gas stream into the $CO_2$ concentrator which comprises the pretreated MOF material;
    capturing, with the $CO_2$ concentrator, $CO_2$ from the gas stream to generate a $CO_2$-free stream in the $CO_2$ concentrator;
    discharging the $CO_2$-free stream from the $CO_2$ concentrator into the atmosphere;
    stopping the introduction of the gas stream into the $CO_2$ concentrator when the pretreated MOF material becomes saturated with $CO_2$;
    regenerating the $CO_2$ concentrator from the saturated MOF material by introducing hot air, hot nitrogen, or a combination thereof, thereby generating a $CO_2$-rich stream, wherein the stream of the hot air or the hot nitrogen or the combination thereof is introduced to the $CO_2$ concentrator at a temperature of approximately 80-150° C., and wherein the hot air, the hot nitrogen, or the combination thereof exit the $CO_2$ concentrator as a part of the $CO_2$-rich gas stream;
    mixing the generated $CO_2$-rich gas stream with a stream of industrial exhaust with similar $CO_2$ concentrations for subsequent purification; and
    utilizing the regenerated $CO_2$ concentrator for future capture of $CO_2$.

2. The method of claim 1, wherein the $CO_2$ concentrator comprises the pretreated MOF with a binder in a closed module and one or more gas valves configured to manipulate the flow of the gas stream inside the $CO_2$ concentrator.

3. The method of claim 2, wherein the binder is an organic polymer or an inorganic binder.

4. The method of claim 1, wherein the gas stream is gas from a natural gas combined cycle (NGCC) exhaust comprising 2-6% $CO_2$, 10-13% O2 and 2-10% $H_2O$ vapor.

5. The method of claim 1, wherein the gas stream is air.

6. The method of claim 1, further comprising cooling the gas stream to approximately 20-25° C. before introduction into the $CO_2$ concentrator.

7. The method of claim 1, wherein the MOF material is in the form of pellets, laminates, or other structured forms.

8. The method of claim 1, wherein the MOF material is pretreated at a temperature in the range of approximately 60-150° C. under dynamic vacuum or dry inert gas.

9. The method of claim 1, wherein the pretreatment of the MOF material removes previously adsorbed molecules.

10. The method of claim 1, wherein the generated $CO_2$-rich stream has a $CO_2$ concentration of approximately 1-50%.

11. The method of claim 1, wherein the $CO_2$-rich stream is 1-10% $CO_2$ and wherein purification of the $CO_2$-rich stream comprises purifying the $CO_2$-rich stream to pure $CO_2$ or to a stream that comprises at least 90% $CO_2$.

12. A method for continuous capturing of $CO_2$ from a gas stream containing approximately 400 ppm to 6% of $CO_2$ using multiple metal organic framework (MOF) based physisorbent $CO_2$ concentrators, comprising:
    pretreating a MOF material under airflow or vacuum, wherein the MOF material is KAUST-7;
    introducing a gas stream into a first $CO_2$ concentrator which comprises the pretreated MOF material;
    capturing, with the first $CO_2$ concentrator, $CO_2$ from the gas stream to generate a $CO_2$-free stream in the first $CO_2$ concentrator;
    discharging the $CO_2$-free stream from the first $CO_2$ concentrator into the atmosphere;
    substituting a second $CO_2$ concentrator comprising pretreated MOF material for the first $CO_2$ concentrator when the pretreated MOF material of the first $CO_2$ concentrator becomes saturated with $CO_2$;

regenerating the first $CO_2$ concentrator from the saturated MOF material by introducing hot air, hot nitrogen, or a combination thereof, thereby generating a $CO_2$-rich stream, wherein the stream of the hot air or the hot nitrogen or the combination thereof is introduced to the $CO_2$ concentrator at a temperature of approximately 80-150° C., and wherein the hot air, the hot nitrogen, or the combination thereof exit the $CO_2$ concentrator as a part of the $CO_2$-rich gas stream;

mixing the generated $CO_2$-rich gas stream with a stream of industrial exhaust with similar $CO_2$ concentrations for subsequent purification; and recycling the regenerated first $CO_2$ concentrator for future capture of $CO_2$.

13. The method of claim 12, wherein the gas stream is gas from a natural gas combined cycle (NGCC) exhaust comprising 2-6% $CO_2$, 10-13% 02 and 2-10% $H_2O$ vapor.

14. The method of claim 12, wherein the MOF material is pretreated at a temperature in the range of approximately 60-150° C. under dynamic vacuum or dry inert gas, and further comprising the step of cooling the gas stream to approximately 20-25° C. before introduction into the first $CO_2$ concentrator.

* * * * *